(12) United States Patent
Balachandran et al.

(10) Patent No.: US 7,054,346 B2
(45) Date of Patent: May 30, 2006

(54) ENHANCED FREQUENCY HOPPING IN A WIRELESS SYSTEM

(75) Inventors: Krishna Balachandran, Middletown, NJ (US); Joseph H Kang, Belle Mead, NJ (US); Kumud K Sanwal, Iselin, NJ (US); James Paul Seymour, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 842 days.

(21) Appl. No.: 09/850,124

(22) Filed: May 7, 2001

(65) Prior Publication Data

US 2002/0164990 A1 Nov. 7, 2002

(51) Int. Cl.
*H04B 1/69* (2006.01)

(52) U.S. Cl. .................. 375/130; 375/136; 375/133; 375/132; 370/287; 455/517

(58) Field of Classification Search ............... 375/130, 375/133, 136, 132; 370/287; 455/517
See application file for complete search history.

(56) References Cited

U.S. PATENT DOCUMENTS

| 4,654,859 | A | * | 3/1987 | Kung et al. | ............... | 375/136 |
|---|---|---|---|---|---|---|
| 5,235,613 | A | | 8/1993 | Brown et al. | | |
| 5,377,221 | A | * | 12/1994 | Munday et al. | ............. | 375/133 |
| 5,453,976 | A | * | 9/1995 | Glanville et al. | ........... | 370/287 |
| 5,541,954 | A | * | 7/1996 | Emi | ............................ | 375/133 |
| 6,223,048 | B1 | | 4/2001 | Barreto et al. | .............. | 455/517 |
| 6,249,540 | B1 | * | 6/2001 | Dicker et al. | ............... | 375/133 |
| 6,272,353 | B1 | * | 8/2001 | Dicker et al. | ............... | 455/517 |
| 6,345,066 | B1 | * | 2/2002 | Haartsen | ..................... | 375/130 |
| 6,400,751 | B1 | * | 6/2002 | Rodgers | ..................... | 375/132 |

FOREIGN PATENT DOCUMENTS

| GB | 2340694 | 2/2000 |
|---|---|---|
| WO | WO 01/11795 | 2/2001 |
| WO | WO 01/29984 | 4/2001 |

OTHER PUBLICATIONS

3GPP TS 05.02, "3$^{rd}$ Generation Partnership Project; Technical Specification Group GERAN; Digital Cellular Telecommunications System; Multiplexing and Multiple Access on the Radio Path (Release 1999)".

* cited by examiner

*Primary Examiner*—Stephen Chin
*Assistant Examiner*—Eva Zheng (57) ABSTRACT

A wireless endpoint employs frequency hopping for communicating signals in a wireless communications system. Over a time period T, the wireless endpoint performs pseudo-random selection of a frequency from a hopping set of N frequencies such that over at least a portion of the time period T, the frequency selection is constrained to less than the N frequencies.

19 Claims, 6 Drawing Sheets

FIG. 1

*Prior Art*

*Prior Art*

| Parameter | Definition | Range |
|---|---|---|
| TDMA Frame Number, FN | TDMA frame number | 0 to (26 × 51 × 2048) - 1 |
| Time parameter, T1R | [FN div (26 × 51)] modulo 64 | 0 to 63 |
| Time parameter, T2 | FN modulo 26 | 0 to 25 |
| Time parameter, T3 | FN modulo 51 | 0 to 50 |
| Hopping Sequence Number (HSN) | Used along with other time parameters to generate a pseudo-random hopping sequence | 0 to 63 |
| NBIN | Number of bits required to represent N | |
| xor | Bit-wise exclusive or of 8 bit binary operands | |

Table One

FIG. 6

| Burst Number | Hopping index | A | Compute Hop Frequency | H | F |
|---|---|---|---|---|---|
| -- | -- | -- | -- | -- | -- |
| 0 | 1 | $A = \{1\ 3\ 4\ 6\}$ | $H_{(1\ mod\ 4)} = H_1 = 3$ | $H = \{1\ 3\ 4\ 6\ 2\ 0\ 5\ 7\}$ | $F = 4$ |
| 1 | 5 | $A = \{1\ 6\ 4\}$ | $H_{(5\ mod\ 3)} = H_2 = 4$ | $H = \{1\ 6\ 4\ 3\ 2\ 0\ 5\ 7\}$ | $F = 3$ |
| 2 | 2 | $A = \{1\ 6\}$ | $H_{(2\ mod\ 2)} = H_0 = 1$ | $H = \{1\ 6\ 4\ 3\ 2\ 0\ 5\ 7\}$ | $F = 2$ |
| 3 | 4 | $A = \{6\}$ | $H_{(4\ mod\ 1)} = H_0 = 6$ | $H = \{6\ 1\ 4\ 3\ 2\ 0\ 5\ 7\}$ | $F = 1$ |
| | | | | $H = \{6\ 1\ 4\ 3\ 2\ 0\ 5\ 7\}$ | $F = 0$, |
| 4 | 1 | $A = \{2\ 0\ 5\ 7\}$ | $H_{(1\ mod\ 4)} = H_1 = 0$ | $H = \{2\ 0\ 5\ 7\ 6\ 1\ 4\ 3\}$ | $F = 4$ |
| ... | ... | ... | ... | $H = \{2\ 7\ 5\ 0\ 6\ 1\ 4\ 3\}$ | $F = 3$ | column 1 ↑
row 1 ↑

Table Two

ENHANCED FREQUENCY HOPPING IN A WIRELESS SYSTEM

FIELD OF THE INVENTION

This invention relates generally to communications and, more particularly, to wireless communications systems.

BACKGROUND OF THE INVENTION

Advances in wireless technologies have propelled a migration in features and services provided to the end user. Network operators may however need to support multiple and perhaps migratory technologies with limited spectrum. Therefore, radio resource management techniques that improve spectral efficiency and/or system capacity are always of interest to network operators.

Higher spectral efficiency and/or voice capacity can be achieved in the Global System for Mobile Communication (GSM) Enhanced Data rates for Global Evolution (EDGE) Radio Access Network (GERAN) through tight frequency reuse (e.g., 1/3 or 1/1 reuse). Current GSM deployments employ techniques such as frequency hopping in order to combat the effects of fading and interference. The performance improvement achieved through frequency hopping for voice users at the link and system level directly translates into higher capacity.

On a GSM full rate traffic channel, 20 ms (milli-second) speech frames are convolutionally encoded and diagonally interleaved over a sequence of 8 bursts in a time slot. In the case of a half rate channel, speech is coded and diagonally interleaved over a sequence of 4 alternate bursts in a time slot. Frequency hopping is carried out burst by burst in order to mitigate the effects of slow fading and interference. It provides the following benefits: fading diversity, interferer diversity, and interference averaging.

In practical systems, the frequency hopping is typically non-ideal and the benefits of fading and interferer diversity are not fully realized. With respect to frequency hopping techniques, GSM specifies cyclic frequency hopping and pseudo-random frequency hopping (e.g., see 3GPP TS 45.002, "$3^{rd}$ Generation Partnership Project; Technical Specification Group GERAN; Digital Cellular telecommunications System (Phase 2+); Multiplexing and Multiple Access on the Radio Path (Release 4)"). If the number of frequencies is sufficient, then cyclic hopping provides full fading diversity. (As referred to herein, full fading diversity is where every burst within the interleaving depth of a speech frame experiences an independent fading state. This is possible only if the number of frequencies is greater than the number of bursts over which a speech frame is interleaved and the frequencies are sufficiently separated from each other.) However, cyclic hopping does not provide the benefits of interferer diversity and interference averaging. The pseudo-random frequency hopping algorithm specified in GSM provides interferer diversity and achieves long-term interference averaging but does not guarantee fading diversity (i.e., no frequency repetitions) within the interleaving depth of a speech frame.

Figure 1:
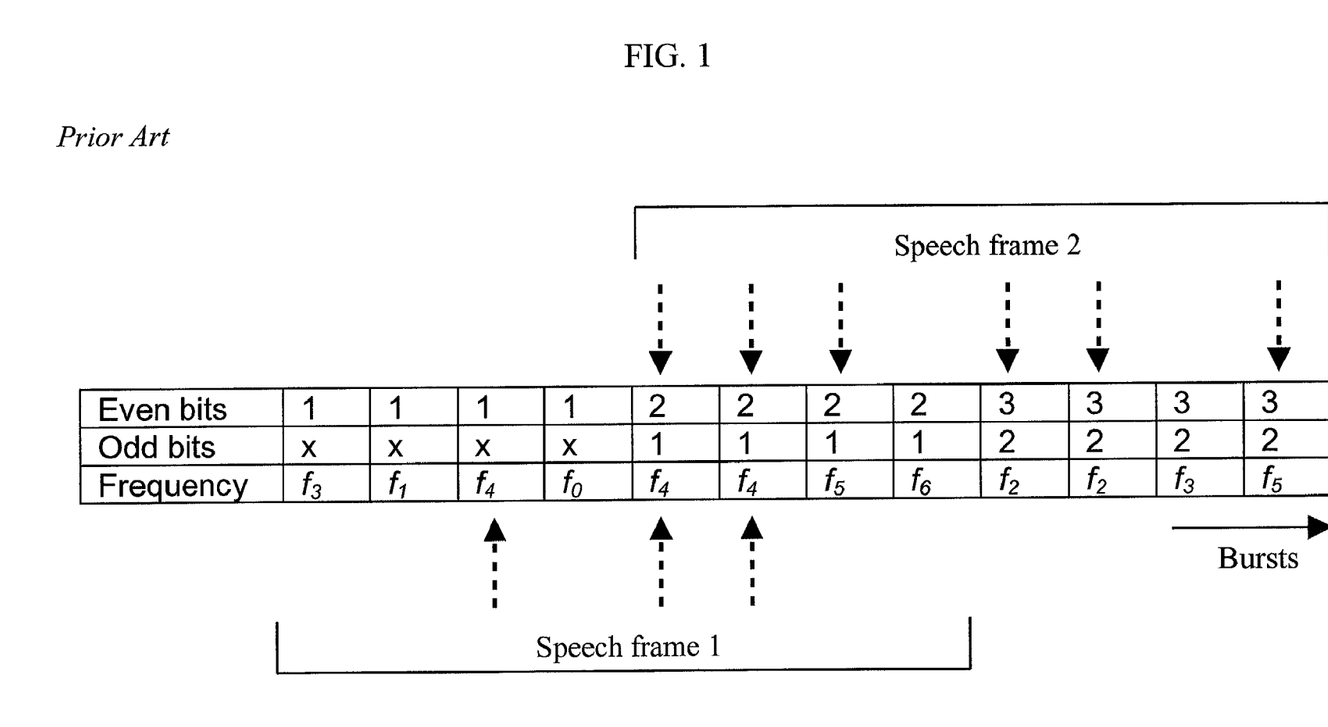
FIG. 1 illustrates prior art frequency repetition in a GSM pseudo-random hopping sequence over an illustrative time period.

With respect to GSM pseudo-random frequency hopping, if a large amount of spectrum is allocated, then there are many frequencies over which users can hop and repeated frequencies over a short interval are not common. However, in limited spectrum scenarios where the number of frequencies are smaller than the number of bursts over the interleaving depth (40 ms in the speech case), frequency repetitions always occur. This is illustrated in FIG. 1 on a full rate traffic channel. For full-rate voice users, eight bursts are transmitted over pseudo-randomly generated frequencies (it is assumed for this example that there are eight frequencies to select from: $f_0$ to $f_7$). As can be observed from FIG. 1, coded speech frame 1 encounters frequency, $f_4$, on 3 out of the 8 bursts that it is interleaved across. This implies that speech frame 1 experiences only 6 out of 8 possible independent fading states (assuming there is sufficient separation between each of the frequencies). Similarly, it can be observed for speech frame 2 that frequencies, $f_2$, $f_4$ and $f_5$ are repeated two times each on the 8 bursts over which coded speech frame 2 is interleaved. In this case, speech frame 2 experiences only 5 out of 8 possible independent fading states. In other words, the GSM pseudo-random frequency hopping algorithm does not maximize the number of unique frequencies (or independent fading states) in this case. This has consequences for low mobility users where the fading tends to be strongly correlated for time duration in excess of the interleaving depth of a speech frame. In this case, users may hop to the same frequency multiple times, experiencing similar channel fading conditions each time. With typical channel coding schemes employed for speech traffic channels and control signaling channels, increased correlation within the interleaving depth can lead to degradation in error performance.

SUMMARY OF THE INVENTION

In accordance with the invention, a wireless endpoint transmits signals using frequency hopping over a time period T by selecting a frequency from a set of N frequencies such that over at least a portion of the time period T, the frequency selection is constrained to less than the N frequencies.

In an embodiment of the invention, a wireless endpoint employs frequency hopping for communicating signals in a wireless communications system. Over a time period T, the wireless endpoint performs pseudo-random selection of a frequency from a hopping set such that over at least a portion of the time period T the choice of frequencies to select from within the hopping set is constrained as a function of previously selected frequencies. In particular, prior selected frequencies are temporarily prohibited from being selected again from the hopping set. Thus, repetition of frequencies over the time period T is reduced.

DETAILED DESCRIPTION

Other than the inventive concept, familiarity with GSM is assumed and is not described herein. For example, other than the inventive concept, a form of frequency hopping used in GSM is described in 3GPP TS 45.002, "3$^{rd}$ Generation Partnership Project; Technical Specification Group GERAN; Digital Cellular telecommunications System (Phase 2+); Multiplexing and Multiple Access on the Radio Path (Release 4)." In addition, the inventive concept is implemented using conventional programming techniques, which as such, will not be described herein.

Figure 2:
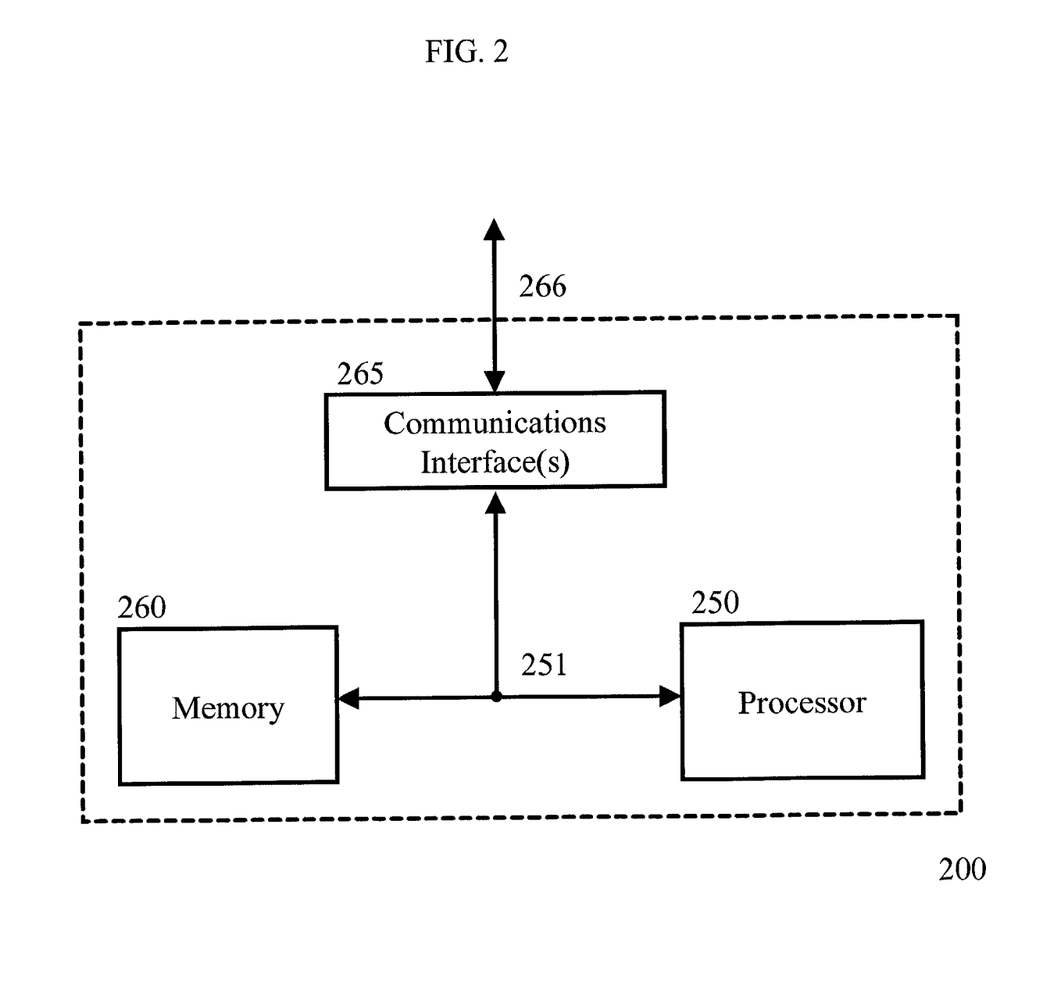
FIG. 2 shows an illustrative high-level block diagram of a wireless endpoint for use in accordance with the principles of the invention.

FIG. 2 shows a high-level block diagram of a representative wireless endpoint 200 for use in accordance with the principles of the invention. Other than the inventive concept, the elements shown in FIG. 2 are well known and will not be described in detail. Wireless endpoint 200 represents a stored-program-control-based processor architecture and includes processor 250, memory 260 (for storing program instructions and data (such as a set of hopping frequencies), as further described below) and communications interface(s) 265 for coupling to one or more wireless communication paths as represented by path 266 (e.g., 265 represents a wireless transmitter and a wireless receiver). In the context of this invention, e.g., processor 250 and memory 260 implement (among other functions not described herein) a constrained frequency hopping method for selecting frequencies for use in transmission of signals via communications interface 265. A detailed description of the reception and transmission of wireless signals is not necessary for the inventive concept and, as such, is not described herein. Except as noted below, it is assumed that the wireless endpoint 200 is a part of a GSM system (not shown) and is in communication with another wireless endpoint (not shown). Wireless endpoint 200 is representative of any wireless device, e.g., a base station, mobile station, user terminal, etc.

Figure 3:
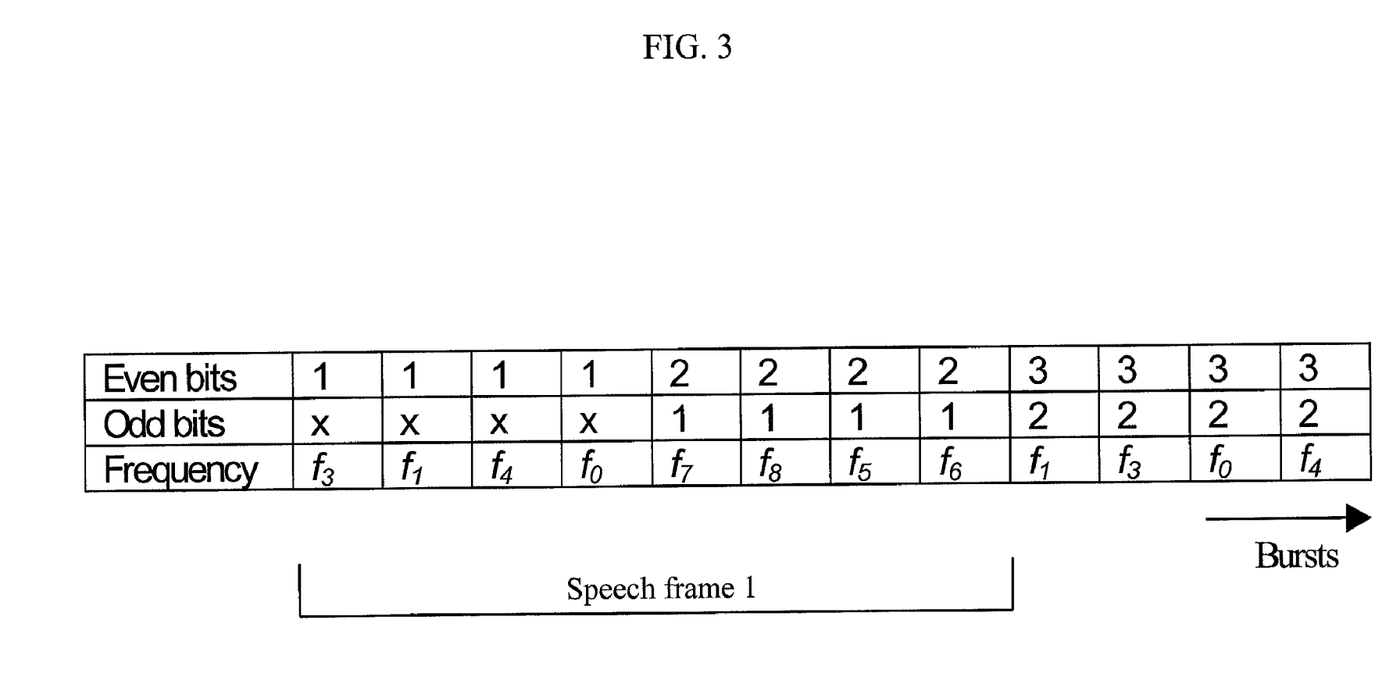
FIG. 3 illustrates constrained frequency hopping in a GSM pseudo-random hopping sequence over an illustrative time period, T.

In accordance with the invention, hopping frequency sequences are constrained in order to reduce, or minimize, repeated frequencies over a time period T. Consider a class of hopping sequences for which constraints are imposed to minimize repeated frequencies. For example, if the total number of frequencies, N, in a hopping set is equal to 4, the hopping sequence is constrained to prevent any repeats within a set of four bursts. Thus across two consecutive sets of four bursts, no frequency would be repeated three or more times. A similar case can be made for N=8. In this case, a constrained hopping sequence prevents the repetition of any frequency over 8 consecutive bursts (i.e., it guarantees 8 independent fading states). Hence, the maximum frequency repeat across an 8-tuple would be 1. This is shown in FIG. 3 for an illustrative speech frame 1, which illustrates constrained frequency hopping on a full rate traffic channel. It should be noted that although the negative effects of frequency repetitions decrease for GSM hopping sets with larger values of N, e.g., N=12, the inventive concept still provides improvement.

In accordance with the invention, a hopping state, H, is defined to be:

$$H = \{H_0, H_1, \ldots, H_{F-1}, H_F, \ldots, H_{N-1}\}, \quad (1)$$

which is a vector of length N, where N is the total number of frequencies available to hop over, and F is $\leq$ N and is the number of frequencies in H over which the wireless endpoint is constrained to hop. H can also be defined as $H = A \cup B$, where $$A = \{H_0, H_1, \ldots, H_{F-1}\}, \quad (2)$$

and is the set of F frequencies over which a wireless endpoint is currently allowed to hop and $$B = \{H_F, \ldots, H_{N-1}\} \quad (3)$$

and is the set of (N–F) frequencies over which a wireless endpoint is not currently allowed to hop. In other words, H can be viewed as being divided into a set of allowable frequencies (A) and a set of prohibited frequencies (B). Let the range of F be defined by $F_{min}$ and $F_{max}$, where $0 \leq F_{min} < F_{max} \leq N$.

Figure 4:
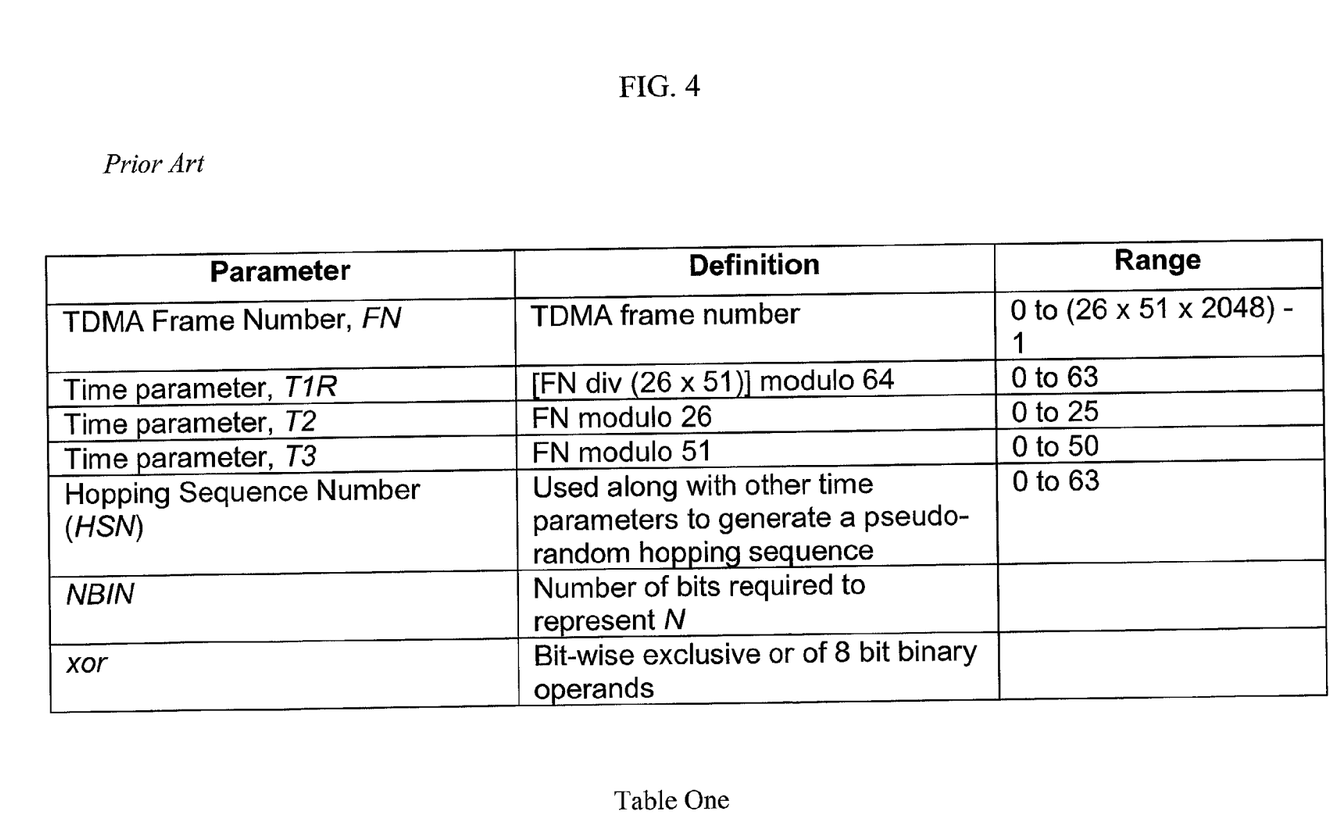
FIG. 4 shows Table One, which lists the parameters used in determining a pseudorandom frequency index S.

For each hop (hops occur every 4.615 ms frame in the case of GSM), the transmitter and receiver (of corresponding wireless endpoints as represented by wireless endpoint 200 of FIG. 2) first use the following procedure in order to determine a pseudo-random frequency index, S (also referred to herein as a hopping index sequence value). Steps (4) through (8), below, are found in section 6.2.3 of the above-mentioned standard, 3GPP TS 45.002. Values for M (where $0 \leq M \leq 152$) and S (where $0 \leq S \leq N-1$) are computed as follows:

$$M = T2 + RNTABLE((HSN \text{ xor } T1R) + T3); \quad (4)$$

$$M' = M \text{ modulo } (2^{NBIN}); \quad (5)$$

$$T' = T3 \text{ modulo } (2^{NBIN}); \quad (6)$$

if M'<N, then (7)

$$S = M'; \quad (8)$$

else, $$S = (M' + T') \text{ modulo } N; \quad (9)$$

where the parameters used above are defined in Table One, which is shown in FIG. 4 (additional information on the parameters shown in Table One are found in the above-mentioned standard—3GPP TS 45.002).

Normally, S is used to select one of the frequencies from H. However, and in accordance with the invention, this pseudo-random frequency index, S, is now used to select one of the allowable frequencies in A. Note, that the pseudo-random frequency index S corresponds to the Mobile Allocation Index (MAI) that is generated by the GSM hopping algorithm for non-zero HSN (Hopping Sequence Number) and MAIO=0, where MAIO is the Mobile Allocation Index Offset. (In the generation of the pseudo-random frequency index, S, as described below for the inventive concept, MAIO=0 is employed for all users in a sector to ensure that users within a sector choose identical indices of H. This guarantees that the hopping states are identical between all users within a sector. In GSM, each user in a sector is assigned a unique MAIO. This ensures that the frequency hopping sequences between users in the same sector are orthogonal. This concept still applies when using the inventive concept described below (e.g., see equation (11), below) as modulo addition of the MAIO guarantees no intra-sector collisions.) Now, let the sequence of pseudo-random frequency indices generated by the above-described algorithm be $S = \{S_0, S_1, S_2, \ldots\}$. Note that $S_i \in \{0, 1, \ldots, N-1\}$ can be larger than the number of allowable frequencies F. Therefore, in this constrained hopping algorithm, a wireless endpoint hops to:

Hopping Frequency=$(H_{S'} + MAIO)$ modulo $N$ where (10)

$$S' = (S_i) \text{ modulo } F. \quad (11)$$

In other words, and in accordance with the invention, S' is restricted to the allowable set, A.

Figure 5:
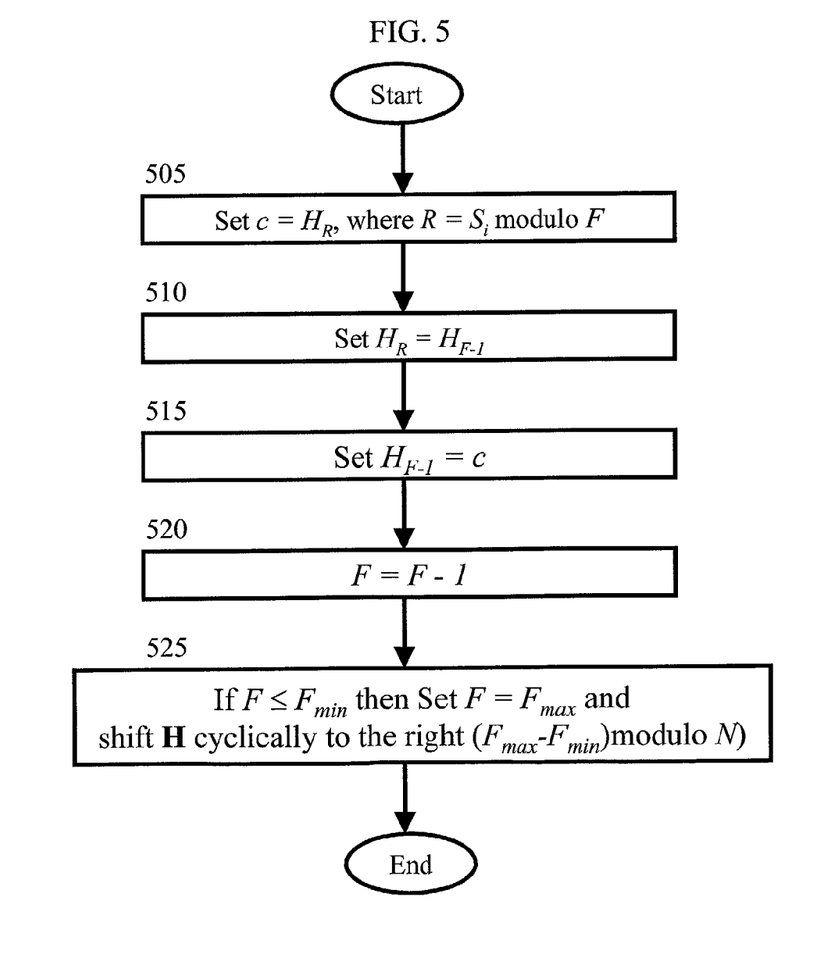
FIG. 5 shows an illustrative flow chart embodying the principles of the invention.

Turning now to FIG. 5, an illustrative flow chart is shown for updating the hopping state for a constrained frequency hopping method in accordance with the principles of the invention. In steps 505, 510 and 515, the value of the currently hopped frequency, $H_R$, is swapped (via the variable c) with $H_{F-1}$, the last allowable frequency in A. Thus, the currently hopped frequency becomes the last element in the set A, at position F-1. In the step 520, the size of A is reduced by decrementing F by one so that the set of frequencies over which the user can hop for the next burst is reduced (thus, excluding the currently hopped frequency, which is now effectively inserted into B). In step 525, if F reaches a predetermined minimum value, $F_{min}$, (e.g., 0), F is reset to $F_{max}$ and H is cyclically shifted to the right by $(F_{max}-F_{min})$ modulo N, and A is set equal to the first $F_{max}$ elements of H (while B=H−A (which in some instances my be the null set)). In this way, the oldest candidates in H can be considered once again.

Consider an example with the following parameters:
N=8 frequencies;
$F_{min}$=0, $F_{max}$=4;
Initial hopping state H={1 3 4 6 2 0 5 7} (obviously, each number in H corresponds to an a priori assigned frequency); and
Initial value of F=4.

Figure 6:
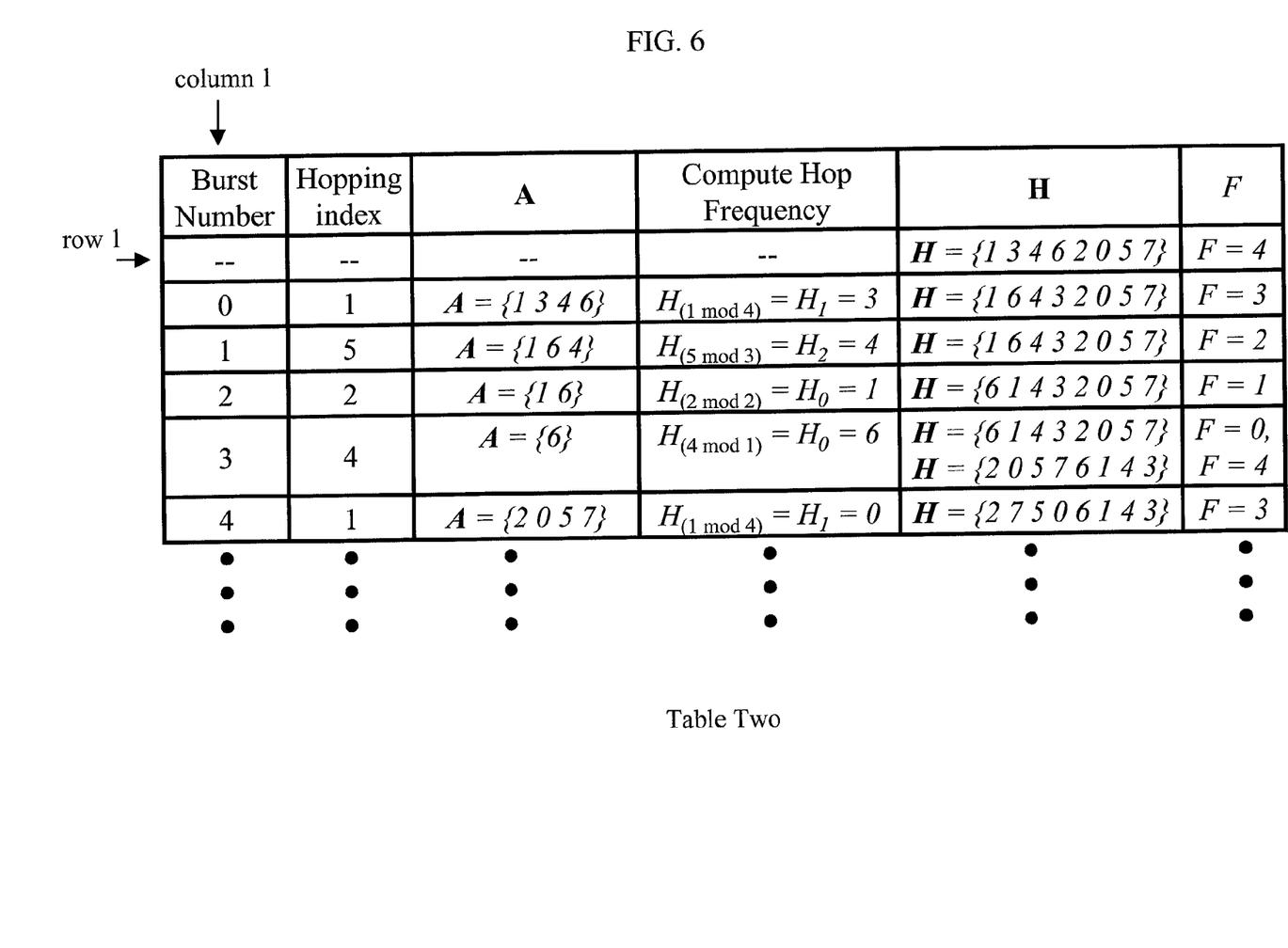
FIG. 6 shows Table Two, which illustrates an application of the inventive concept.

Table Two, shown in FIG. 6, illustrates the constrained frequency hopping method when the GSM hopping index sequence, S, is illustratively equal to {1 5 2 4 1 . . . } for the first 5 bursts (burst number 0 through burst number 4). As can be observed from Table Two, the first column shows the burst number; the second column shows the associated value of the hopping index sequence for that burst number (taken from S={1 5 2 4 1 . . . }); the third column illustrates the allowable frequency set A; the fourth column shows the computed hop frequency in accordance with equations (10) and (11), above; the fifth column shows the updating of H (or equivalently A (and B for that matter)) using the method shown in FIG. 5; and the sixth column illustrates the value of F.

As noted above, and shown in the first row of Table Two, the initial set of hopping frequencies is H={1 3 4 6 2 0 5 7} and F=4. As such, for the first burst number of 0, A is effectively set equal to the first four hopping frequencies of H, as shown in row 2 of Table Two (and the remaining frequencies of H are a part of B). The hop frequency is computed in accordance with equation (11), above, with the result shown in row 2 of Table Two, i.e., $H_1$=3. H is now adjusted as shown in the flow chart of FIG. 5, i.e., H={1 6 4 3 2 0 5 7}. In other words, the frequency value at the computed index position 1 is exchanged with the frequency value at index position (F−1). In this example, 3 is exchanged with 6 at the $1^{st}$ and $3^{rd}$ positions (recalling that the position index begins at 0). Finally, F is adjusted to 3, as shown in the final column entry for row 2 of Table Two.

As a result, since F is now equal to 3, for the next burst number of 1, the next hop frequency is now restricted to 1, 6, or 4 since the size of A has been reduced as shown in row 3 of Table 2. (Alternatively, the allowed frequency selections from H have been constrained to the first three frequencies.) The hop frequency is computed in accordance with equation (11), above, with the result shown in row 3 of Table Two, i.e., $H_2$=4. H is now adjusted as shown in the flow chart of FIG. 5, i.e., H={1 6 4 3 2 0 5 7}. In other words, the frequency value at the computed index position 2 is exchanged with the frequency value at index position (F−1). In this example though the positions are the same since the selected index position and the value of F are the same, i.e., 3. Therefore, the ordering of the frequencies in H does not change. Finally, F is adjusted to 2, as shown in the final column entry for row 3 of Table Two.

For the next burst number of 2, the next hop frequency is now restricted to 1 and 6 since the size of A has been reduced as shown in row 4 of Table 2 (since F now equals 2). The hop frequency is computed in accordance with equation (11), above, with the result shown in row 4 of Table Two, i.e., $H_0$=1. H is now adjusted as shown in the flow chart of FIG. 5, i.e., H={6 1 4 3 2 0 5 7}. In other words, the frequency value at the computed index position 0 is exchanged with the frequency value at index position (F−1). In this example, 1 is exchanged with 6 at the $0^{th}$ and $1^{st}$ positions. Finally, F is adjusted to 1, as shown in the final column entry for row 4 of Table Two.

For the next burst number of 3, the next hop frequency is now restricted to 6 since the size of A has been reduced as shown in row 5 of Table 2 (since F now equals 1). The hop frequency is computed in accordance with equation (11), above, with the result shown in row 5 of Table Two, i.e., $H_0$=6. H is now adjusted as shown in the flow chart of FIG. 5, i.e., H={6 1 4 3 2 0 5 7}. In other words, the frequency value at the computed index position 0 is exchanged with the frequency value at index position (F−1). In this example though the positions are the same since the selected index position and the value of F are the same, i.e., 0. As such, the ordering of the frequencies in H does not change. Finally, F is adjusted to 0, as shown in the final column entry for row 5 of Table Two. However, this update to F indicates that the minimum value is reached and hence, H is cyclically shifted by $(F_{max}-F_{min})$ mod N=4 and F is reset to $F_{max}$=4. This is shown by the additional entries in row 5 of columns 5 and 6 of Table Two, where now H={2 0 5 7 6 1 4 3} and F=4. Consequently, for the next burst number of 4, the size of A has been increased as shown in row 6 of Table 2 (since F now equals 4) and A={2 0 5 7}. As a result of this constrained frequency hopping method, the hop sequence for the first 5 burst numbers is: 3, 4, 1, 6, (of course assuming that the MAIO associated with this user equals 0, else refer to equation (11)).

This algorithm is stated in a general way to allow flexibility in the actual implementation. Although the proposed change ultimately alters the hopping sequence, this algorithm uses the existing GSM hopping framework thus allowing legacy mobiles to be easily supported. In addition, the similarity to the current GSM hopping algorithm allows this feature to be turned off for cases such as large spectrum deployments where little to no gains do not warrant the additional complexity. In such cases, the regular GSM hopping algorithm can be employed.

Note, it is recommended that wireless endpoints run the proposed algorithm at all times, even during silence, in order to maintain the hopping state. Maintaining hopping states is needed to ensure that there are no intra-sector collisions.

Since the algorithm considers consecutive bursts spanning multiple frames, the algorithm easily applies to full rate voice (diagonally interleaved) and data (block interleaved) services. The algorithm also applies to half rate voice if N≧8.

The following should be noted with respect to protocol aspects. When a user enters the system (e.g. at the start of a voice call), the wireless endpoint must know the hopping state, H, the number of currently allowable frequencies, F, and the range of F defined by Fmin and Fmax where 0≦Fmin<Fmax≦F. Fmin and Fmax are assumed to be provided during call setup. The network can provide H and F to a wireless endpoint (e.g., a user terminal) in any number of ways, such as:

1) These parameters can be provided during call setup signaling from another wireless endpoint along with an associated timestamp by suitable modification of messages used in existing call setup protocols. Since the algorithm to reconstruct the time evolution of H and F are known, either wireless endpoint can then determine the state information at the current time (effectively providing information on A, etc.); or 2) Alternatively, state information can be autonomously derived at a wireless endpoint by refreshing the state information at pre-determined time instants. For example, the state can be refreshed (i.e., $H=\{H_0, H_1, \ldots, H_{N-1}\}$, F=Fmax) at predetermined time instants. The wireless endpoint can then reconstruct the time evolution of H and F from the previous refresh instant to the current time.

As described above, and in accordance with the invention, a constrained hopping sequence has been described for reducing the rate at which frequencies are repeated (or alternatively, maximizes the number of independent fading states). The use of constrained frequency hopping allows GSM pseudo-random frequency hopping to achieve full fading diversity under spectrum constraints within the interleaving depth of a speech frame. As such, the constrained hopping algorithm maximizes the number of unique frequencies that occur over the interleaving depth of a speech frame. This permits an improvement in fading diversity performance with negligible impact on interferer diversity and interference averaging capability of the existing GSM pseudo-random hopping algorithm.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of pseudo-random frequency selection, other selection methods may be used. Also, although shown as a separate elements, any or all of the elements of FIG. 1 (e.g., 260) may be implemented in a stored-program-controlled processor.

What is claimed:

1. A method for use in wireless equipment, the method comprising the steps of:
    transmitting signals using frequency hopping over a time period T, by
    pseudorandomly selecting a frequency from a set of N frequencies such that over at least a portion of the time period T, the frequency selection is constrained to less than the N frequencies and such that at least one of the selected frequencies is prohibited from subsequent selection in at least a portion of the time period T,
    where N is the total number of frequencies available for frequency hopping.

2. A method of frequency hopping for use in wireless equipment, the method comprising the steps of:
    storing a set of hopping frequencies; and
    pseudorandomly selecting frequencies from the set of hopping frequencies over a time period T by limiting the available frequencies from the hopping set over at least a portion of the time period T such that at least one of the selected frequencies is prohibited from subsequent selection in at least a portion of the time period T.

3. A method of frequency hopping for use in wireless equipment, the method comprising the steps of:
    initializing a hopping set to a size of F frequencies, the hopping set used to pseudorandomly select therefrom hopping frequencies over a time period T; and
    reducing the size of the hopping set over a portion of the time period T by at least one frequency such that at least one of the selected frequencies is prohibited from subsequent selection in at least a portion of the time period T,
    where F is the number of frequencies in a hopping state, H, over which a wireless endpoint is constrained to hop.

4. A method of frequency hopping for use in wireless equipment, the method comprising the steps of:
    initializing a hopping set to a size of N frequencies, the hopping set used to select therefrom hopping frequencies over a time period T; and
    pseudorandomly selecting frequencies from the hopping set over the time period T such that at least one of the selected frequencies is prohibited from subsequent selection in at least a portion of the time period T,
    where N is the total number of frequencies available for frequency hoping.

5. A method of frequency hopping for use in wireless equipment, where a hopping set is initialized to a size of N frequencies, the hopping set used to select therefrom hopping frequencies over a time period T, the method comprising the steps of:
    determining a hopping index value;
    modifying the hopping index value by at least the modulo of a number F, where $F \leq N$;
    pseudorandomly selecting a hopping frequency from the hopping set of a function of the modified hopping index value;
    adjusting the order of the hopping set such that the selected hopping frequency is now at a position corresponding to the value of F and such that at least one of the selected frequencies is prohibited from subsequent selection in at least a portion of the time period T;
    reducing the value of F, and
    returning to the determining step,
    where N is the total number of frequencies available for frequency hopping and where F is the number of frequencies in a hopping state, H, over which a wireless endpoint is constrained to hop.

6. The method of claim 5 wherein when the value of F reaches a predefined minimum value, further including the step of shifting the hopping set in a cyclical direction by a value equal to a difference between a predefined maximum value for F and the minimum value, modulo N.

7. A method for frequency hopping for use in wireless equipment, the method comprising the steps of:
    initializing a hopping set to a size of N frequencies, the hopping set used to select therefrom hopping frequencies over a time period T;
    dividing the hopping set into an allowable frequency set and a prohibited frequency set;
    pseudorandomly selecting frequencies from the allowable frequency set; and
    after at least one frequency selection, adjusting the membership in the allowable frequency set and the prohibited frequency set such that at least one of the selected frequencies is prohibited from subsequent selection in at least a portion of the time period T,
    where N is the total number of frequencies available for frequency hopping.

8. The method of claim 7 wherein membership in the allowable frequency set and the prohibited frequency set at a current time is derived from knowledge of the allowable frequency set and the prohibited frequency set at an earlier time.

9. The method of claim 7 wherein knowledge of the allowable frequency set and the prohibited frequency set at a particular time is provided by one wireless endpoint to another wireless endpoint through explicit signaling.

10. The method of claim 7 wherein all N frequencies in the hopping set are assumed allowable at pre-determined time instants.

11. A pseudorandom frequency hopping method for use in wireless equipment, the method comprising the steps of:
dividing a hopping set into an allowable frequency set and a prohibited frequency set; and
transmitting information associated with the division of the hopping set to another wireless endpoint such that at least one of the selected frequencies is prohibited from subsequent selection in at least a portion of the time period T.

12. The method of claim 11 wherein the transmitted information enables the other wireless endpoint to derive the allowable frequency set.

13. A wireless endpoint comprising:
a transmitter for transmitting signals using frequency hopping over a time period T; and
a processor for pseudorandomly selecting a frequency from a set of N frequencies such that over at least a portion of the time period T, the frequency selection is constrained to less than the N frequencies and such that at least one of the selected frequencies is prohibited from subsequent selection in at least a portion of the time period T,
where N is the total number of frequencies available for frequency hopping.

14. A wireless endpoint comprising:
a memory for storing a set of hopping frequencies; and
a processor for pseudorandomly selecting frequencies from the set of hopping frequencies over a time period T by limiting the available frequencies from the hopping set over at least a portion of the time period T such that at least one of the selected frequencies is prohibited from subsequent selection in at least a portion of the time period T.

15. A wireless endpoint comprising:
a memory for storing a hopping set comprising F frequencies, the hopping set used to pseudorandomly select therefrom hopping frequencies over a time period T; and
a processor for reducing the size of the hopping set over a portion of the time period T by at least one frequency such that at least one of the selected frequencies is prohibited from subsequent selection in at least a portion of the time period T,
where F is the number of frequencies in a hopping state, H, over which a wireless endpoint is constrained to hop.

16. A wireless endpoint comprising:
a memory for storing a hopping set comprising N frequencies, the hopping set used to select therefrom hopping frequencies over a time period T; and
a processor for pseudorandomly selecting frequencies from the hopping set over a time period T such that at least one of the selected frequencies is prohibited from subsequent selection in at least a portion of the time period T,
where N is the total number of frequencies available for frequency hopping.

17. A wireless endpoint comprising:
a memory for storing a hopping set comprising N frequencies, the hopping set used to pseudorandomly select therefrom hopping frequencies over a time period T; and
a processor for (a) determining a hopping index value, (b) modifying the hopping index value by at least the modulo of a number F where $F \leq N$, (c) selecting a hopping frequency from the hopping set as a function of the modified hopping index value, (d) adjusting the order of the hopping set such that the selected hopping frequency is now at a position corresponding to the value of F such that at least one of the selected frequencies is prohibited from subsequent selection in at least a portion of the time period T, (e) reducing the value of F; and (f) returning to (a),
where N is the total number of frequencies available for frequency hopping and where F is the number of frequencies in a hopping state, H, over which a wireless endpoint is constrained to hop.

18. The wireless endpoint of claim 17 wherein when the value of F reaches a predefined minimum value, the processor further shifts the hopping set in a cyclical direction by a value equal to a difference between a predefined maximum value for F and the minimum value, modulo N.

19. A wireless endpoint comprising:
a memory for storing a hopping set comprising N frequencies, the hopping set used to select therefrom hopping frequencies over a time period T; and
a processor for (a) dividing the hopping set into an allowable frequency set and a prohibited frequency set, (b) pseudorandomly selecting frequencies from the allowable frequency set, and (c) after at least one frequency selection, adjusting the membership in the allowable frequency set and the prohibited frequency set such that at least one of the selected frequencies is prohibited from subsequent selection in at least a portion of the time period T,
where N is the total number of frequencies available for frequency hopping.

* * * * *